United States Patent
Ramalho et al.

(10) Patent No.: US 9,088,530 B2
(45) Date of Patent: Jul. 21, 2015

(54) MAXIMIZING BOTTLENECK LINK UTILIZATION UNDER CONSTRAINT OF MINIMIZING QUEUING DELAY FOR TARGETED DELAY-SENSITIVE TRAFFIC

(71) Applicant: Cisco Technology, Inc., San Jose, CA (US)

(72) Inventors: Michael A. Ramalho, Sarasota, FL (US); Mihailo Zilovic, Princeton, NJ (US); James E. Coffman, Boulder, CO (US); Daniel G. Wing, San Jose, CA (US); Mohamed Zanaty, Cary, NC (US); Bill VerSteeg, Buford, GA (US)

(73) Assignee: Cisco Technology, Inc., San Jose, CA (US)

( * ) Notice: Subject to any disclaimer, the term of this patent is extended or adjusted under 35 U.S.C. 154(b) by 172 days.

(21) Appl. No.: 13/952,980

(22) Filed: Jul. 29, 2013

(65) Prior Publication Data

US 2015/0029852 A1 Jan. 29, 2015

(51) Int. Cl.
*H04J 3/16* (2006.01)
*H04L 12/927* (2013.01)
*H04L 12/851* (2013.01)
*H04L 12/853* (2013.01)

(52) U.S. Cl.
CPC .......... *H04L 47/805* (2013.01); *H04L 47/2416* (2013.01); *H04L 47/2441* (2013.01)

(58) Field of Classification Search
None
See application file for complete search history.

(56) References Cited

U.S. PATENT DOCUMENTS

| | | | |
|---|---|---|---|
| 6,631,134 B1 | 10/2003 | Zadikian et al. | |
| 6,781,956 B1 | 8/2004 | Cheung | |
| 6,950,391 B1 | 9/2005 | Zadikian et al. | |
| 7,424,014 B2 | 9/2008 | Mattes et al. | |
| 7,489,636 B1 | 2/2009 | Cheung | |
| 7,602,807 B2 | 10/2009 | Zadikian et al. | |
| 7,668,090 B1 | 2/2010 | Charny | |
| 7,840,841 B2 | 11/2010 | Huang et al. | |
| 7,843,930 B2 | 11/2010 | Mattes et al. | |
| 2004/0165528 A1* | 8/2004 | Li et al. | 370/230 |
| 2005/0094643 A1* | 5/2005 | Wang et al. | 370/395.4 |
| 2011/0019670 A1 | 1/2011 | Mattes et al. | |
| 2012/0096159 A1* | 4/2012 | Short et al. | 709/225 |
| 2012/0127857 A1 | 5/2012 | Sundar et al. | |
| 2013/0044604 A1* | 2/2013 | Hatley | 370/241 |

OTHER PUBLICATIONS

Kempe, E., "Designing Multipoint WAN QoS BRKRST-3500", Cisco Live, Jul. 2011, 127 pages, Cisco Systems, Inc., Las Vegas, Nevada.
Toastman, et al., "Using QOS—Tutorial and Discussion", LinksysInfo.org, Online Forum: http://www.linksysinfo.org/index.php?threads/using-qos-tutorial-and-discussion.28349/, Dec. 2008, pp. 1-53, XenForo, Ltd.

* cited by examiner

*Primary Examiner* — Duc C Ho
(74) *Attorney, Agent, or Firm* — Parker Ibrahim & Berg LLC; James M. Behmke; Stephen D. LeBarron

(57) ABSTRACT

In one embodiment, a system and method include determining bandwidth of a link that connects a local modem to a remote router. A first percentage of the bandwidth is assigned to a first class of data and a second percentage of bandwidth is assigned to a second class of data. The remaining percentage of the bandwidth is assigned for nominal excess capacity. The flow of first class of data and second class of data are controlled to below respective percentages of the bandwidth.

23 Claims, 14 Drawing Sheets

MAXIMIZING BOTTLENECK LINK UTILIZATION UNDER CONSTRAINT OF MINIMIZING QUEUING DELAY FOR TARGETED DELAY-SENSITIVE TRAFFIC

TECHNICAL FIELD

The present disclosure relates generally to computer networks, and, more particularly, to minimizing queue delay of an external router using an internal router.

BACKGROUND

Best-effort (BE) delivery describes a network service or link in which the network or link does not provide any guarantees that data is delivered or that a user is given a guaranteed quality of service (QoS) level or a certain priority. In a best-effort network all users obtain best-effort service, meaning that they obtain unspecified variable bit rate and delivery time, depending on the current traffic load.

These BE/non-QoS Internet Service Provider (ISP) customer connections do not prioritize different flows that originate from different "Internet sources" to the customer. This lack of prioritization causes many "real-time" packets, which need to traverse the ISP to the customer quickly, to be caught behind other customer traffic that does not have such a time sensitive delivery constraint. A bottleneck link is often the last link to the customer from a service provider and is generally a BE/non-QoS link. The packets may be dropped from the bottleneck link or a queue may form at the service provider when volume on the bottleneck link is too high.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a system and method include determining bandwidth of a link that connects a local modem to a remote router. A first percentage of the bandwidth is assigned to a first class of data and a second percentage of bandwidth is assigned to a second class of data. The remaining percentage of the bandwidth is assigned as nominal excess capacity. The flow of first class of data and second class of data are controlled to be nominally below respective percentages of the bandwidth.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Figure 1:
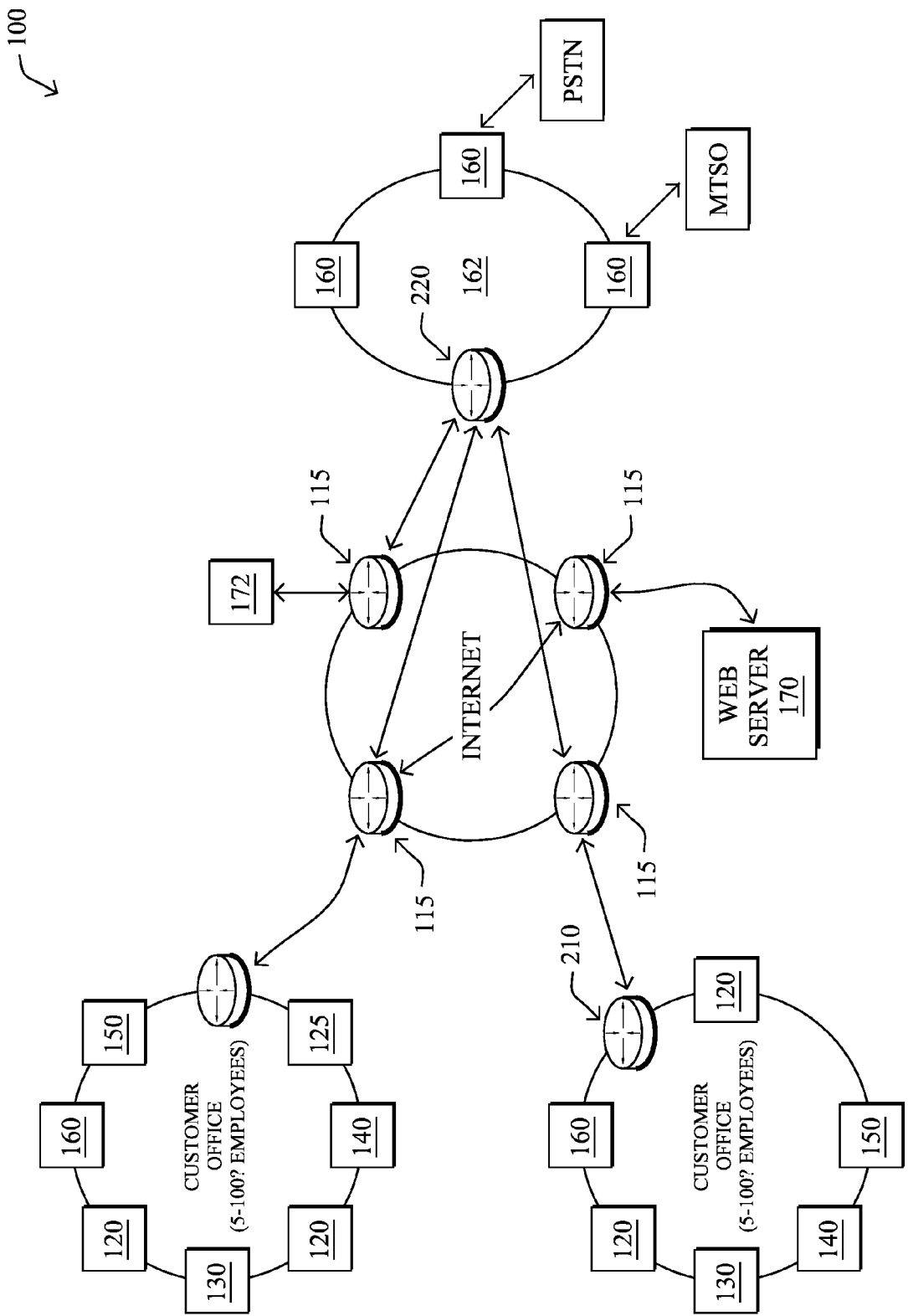
FIG. 1 illustrates an example communication network.

FIG. 1 is a schematic diagram of an example computer network 100 illustratively comprising a nodes/device 200 interconnected by various methods of communication to one or more electronic devices (telephone 120, server 140, VoIP phone 160, video phone 150, laptop 130, and/or PC 125). Node/device 200 is also connected to service provider (SP) router 110 via link 180.

SP router connects to other routers 115, which may connect to other client edge (CE) routers 210, web server(s) 170, and/or other devices 172. A client edge router 200, and/or 210 may be for a small network such as company or school. Edge router 220 may connects a cloud-based data center 162. Additionally or alternatively, edge router 220 may be a core router and assist in a service such as connecting mobile devices into voice over IP (VoIP) via mobile transport switching office (MTSO). Additionally, VoIP may be provided to a standard telephone via public switched telephone network (PSTN). Data then may be sent from web server 170 and/or VoIP device 160 via router 220 to CE router 200 via router 200. The traffic received at CE router 200 may include any mix of TCP traffic (web pages, documents, emails, etc.), voice, video, and/or any other time sensitive data. However, as described herein for best-effort traffic, there is no priority for time sensitive data, which may result in the time sensitive data being queued behind non-time sensitive data such as TCP data at the SP router 110.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages sent between the devices/nodes) may be exchanged among the nodes/devices of the computer network 100 using predefined network communication protocols such as certain known wired and/or wireless protocols where appropriate. In this context, a protocol consists of a set of rules defining how the nodes interact with each other.

Figure 2:
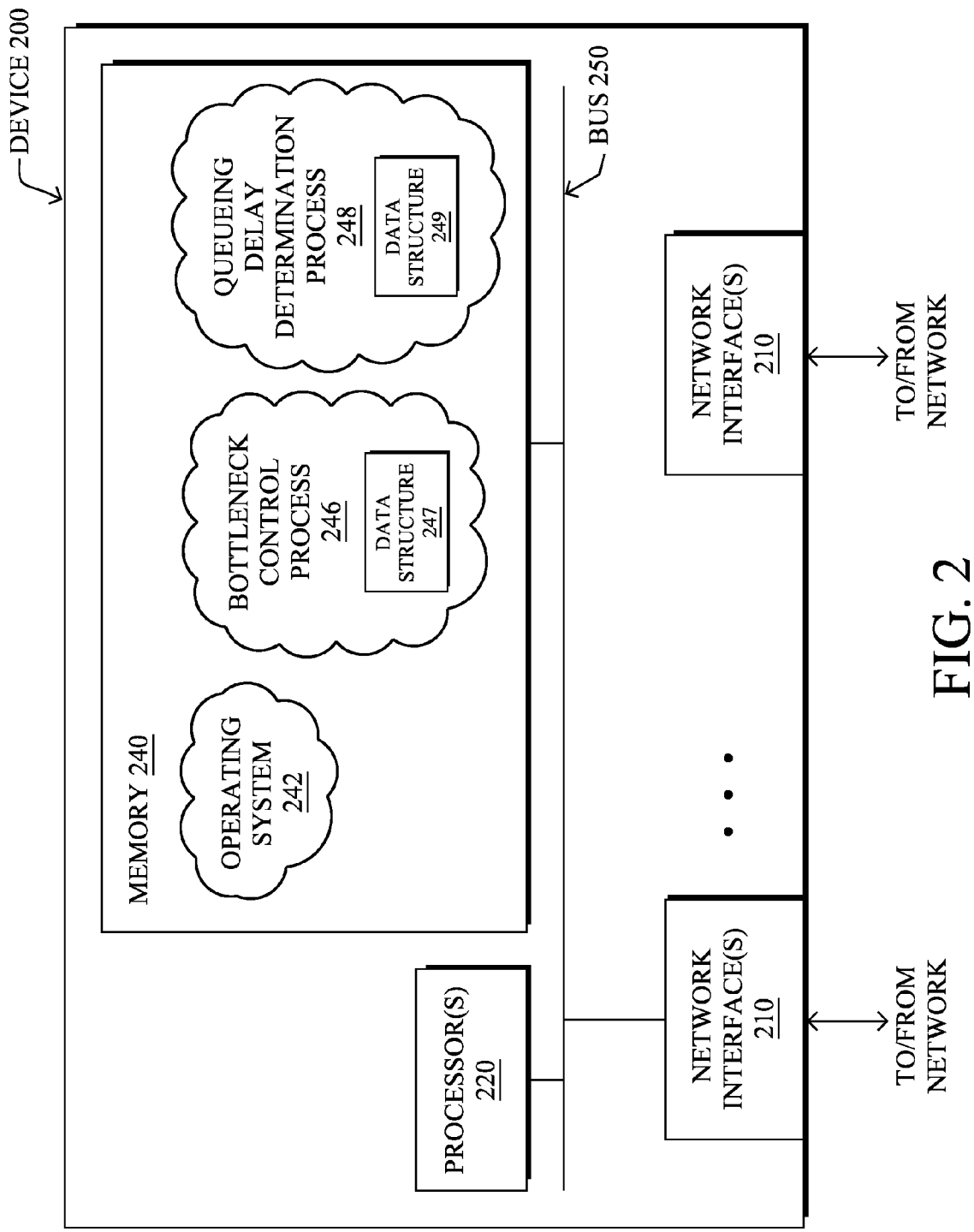
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, etc.), at least one processor 220, and a memory 240 interconnected by a system bus 250, as well as a power supply (e.g., battery, plug-in, etc.).

The network interface(s) 210 contain the mechanical, electrical, and signaling circuitry for communicating data over link 180 (shown in FIG. 1) coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate data structures. An operating system 242, portions of which are typically resident in memory 240 and executed by the processor, functionally organizes the device by, inter alia, invoking operations in support of software processes and/or services executing on the device. These software processes and/or services may comprise bottleneck control process 246, and/or queuing delay determination process 248, as described herein. Note that while bottleneck control process 246, and/or queuing delay determination process 248 is shown in centralized memory 240, alternative embodiments provide for the process to be specifically operated within the network interfaces 210. Another alternative is a separate stand-alone device anywhere on the path in customer premises that allows the device to see sent and/or received packets and make the appropriate measurements. (See FIG. 9 for more detail).

Illustratively, the techniques described herein may be performed by hardware, software, and/or firmware. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Bottleneck control process 246 contains computer executable instructions executed by the processor 220 to perform functions relating to the techniques herein as described in greater detail below, such as to define at least two different types of traffic and to manage a bandwidth nominal excess capacity. Further, bottleneck control process 246 includes data structure 247 that may be used to store the percentage of bandwidth assigned to each of the different types of traffic and the nominal excess capacity. Additionally, the bottleneck control process 246 may determine if the nominal excess capacity target should be modified larger or smaller.

Queuing delay determination process 248 contains computer executable instructions executed by the processor 220 to perform functions relating to the techniques herein as described in greater detail below, such as to receive a plurality of time stamps, and/or time probes from another device and to determine if significant queuing delay exists. The queuing delay determination process 248 receives the time stamps and determines the difference in send time and receives time for each time stamp. Further, the queuing delay determination process 248 determines a first median difference between send and receive times for a first time period and a second median difference between send and receive times for a second time period. The second time period may be a part of the first time period. For example, the second time period may be the last 150 ms of the first time period. The queuing delay determination process 248 may then determine if there is a significant queuing delay, if the queuing delay is increasing, and/or if the queuing delay is decreasing. The queuing delay determination process 248 may include data structure 249 for storing the first median difference and/or the second median difference.

Figure 3:
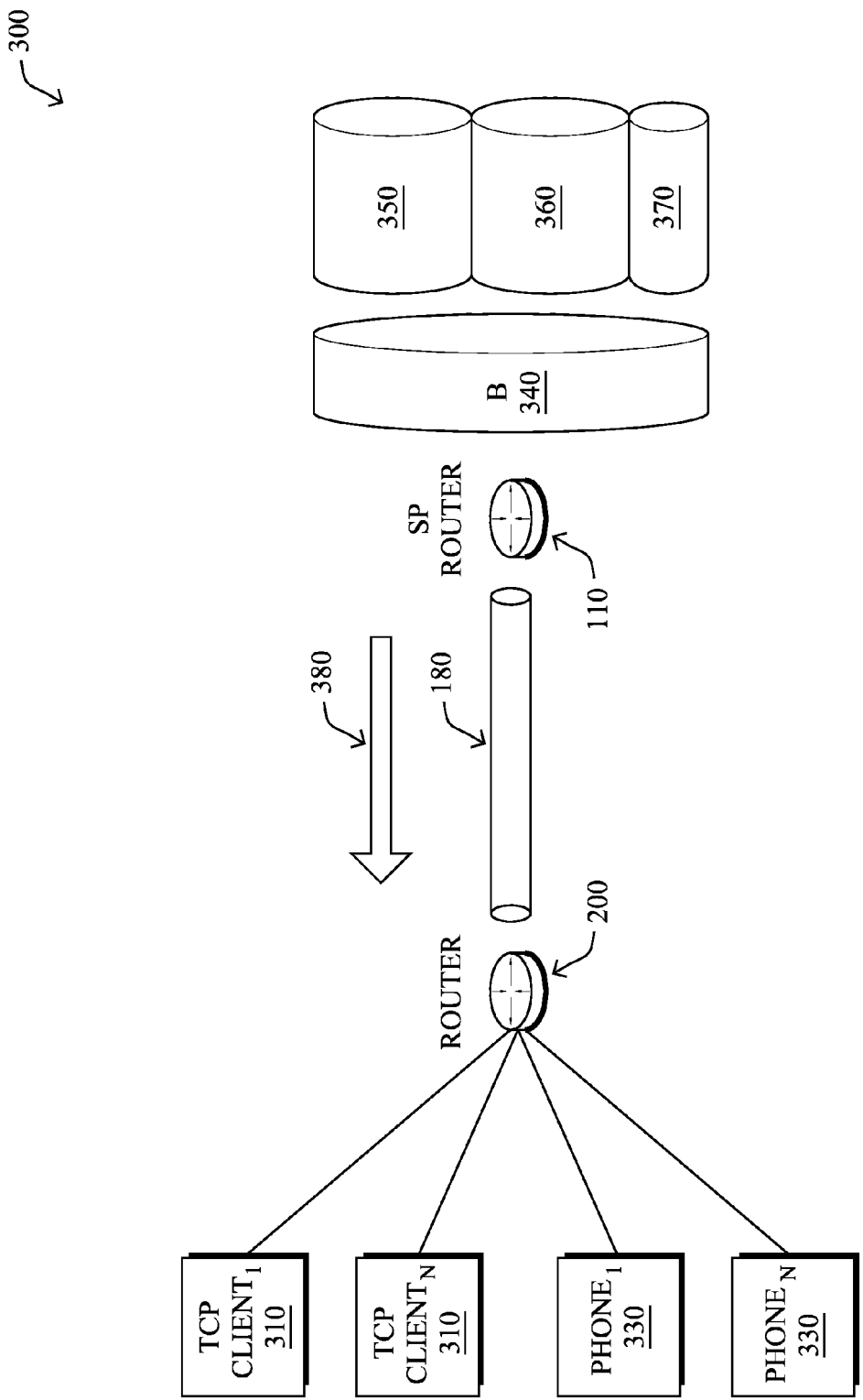
FIG. 3 illustrates an example view of the communication network with respect to client edge router and service provider router.

FIG. 3 illustrates an example simplified view of the communication network 300 with respect to client edge (CE) router 200 and service provider (SP) router 110. The goal of the communication network 300 is to control the ingress (toward the customer) queue at the SP router 110 by the CE router 200 taking proactive steps toward limiting the future flow of at least one type of data that flows down 380 to the CE router 200.

The CE router 200 is connected to the SP router through link 180. Link 180 has a sustained bandwidth $B_{LT}$. The sustained bandwidth $B_{LT}$ may be determined by a speed test over a period of time, generally a few seconds, at a minimum-use hour. The maximum bandwidth, $B_{MAX}$, of link 180 is typically larger than the sustained bandwidth, $B_{LT}$ for many access link types. The flow limit bandwidth, $B_{FL}$, is the max instantaneous bandwidth target toward the CE router 200.

The bottleneck control process 246 within the CE router 200 defines at least a first class of traffic (protected class) 350 and a second class of traffic (unprotected class) 360. The first class of traffic 350 may be a protected class of traffic such as video and/or voice. Alternatively, the first class of traffic 350 may be for a specific type of type of TCP traffic where a client wants ultra-low latency, for example a certain type of financial TCP traffic that a client wants priority over other TCP traffic. In other words, the system engineers the bandwidth for the first class traffic to a value sufficient to meet customer's quality of experience for the type of traffic within the first class. The second class of traffic 360 is generally TCP traffic such as webpages, emails, photos, etc. where the data is not as time dependent and/or critical for the customer. Generally TCP traffic is sent over link 180 at an increasing rate until a packet is dropped or a message is sent to slow down the TCP traffic and then the TCP traffic is cut in half and starts increasing again until the next packet loss or slow down message.

The bottleneck control process 246 assigns a certain percentage to the first class of traffic 350. This percentage may be determined by a user, IT manager, system administrator or other personnel, based on history, necessity, or for any other reason. The bottleneck control process 246 also assigns a certain percentage to the second class of traffic 360. Initially, the percentage assigned to the first class may be set by a user, IT manager, system administrator or other personnel, based on history, or other factors. The nominal excess capacity target is defined as the remaining percentage of the link bandwidth after subtracting the bandwidth of the first and second classes of traffic defined above. This nominal excess capacity target needs to be sufficient to prevent a significant queue from building up at the service provider 110.

As an example illustration, the bottleneck control process 246 may assign 35% of bandwidth (B) to the first class of traffic 350, 35% of bandwidth (B) to the second class of traffic 360, and 30% of bandwidth (B) as the nominal excess capacity target percentage 370. Overtime, the percentages applied may change as result of determining if a queue exists in the service provider router 110.

Figure 4A:
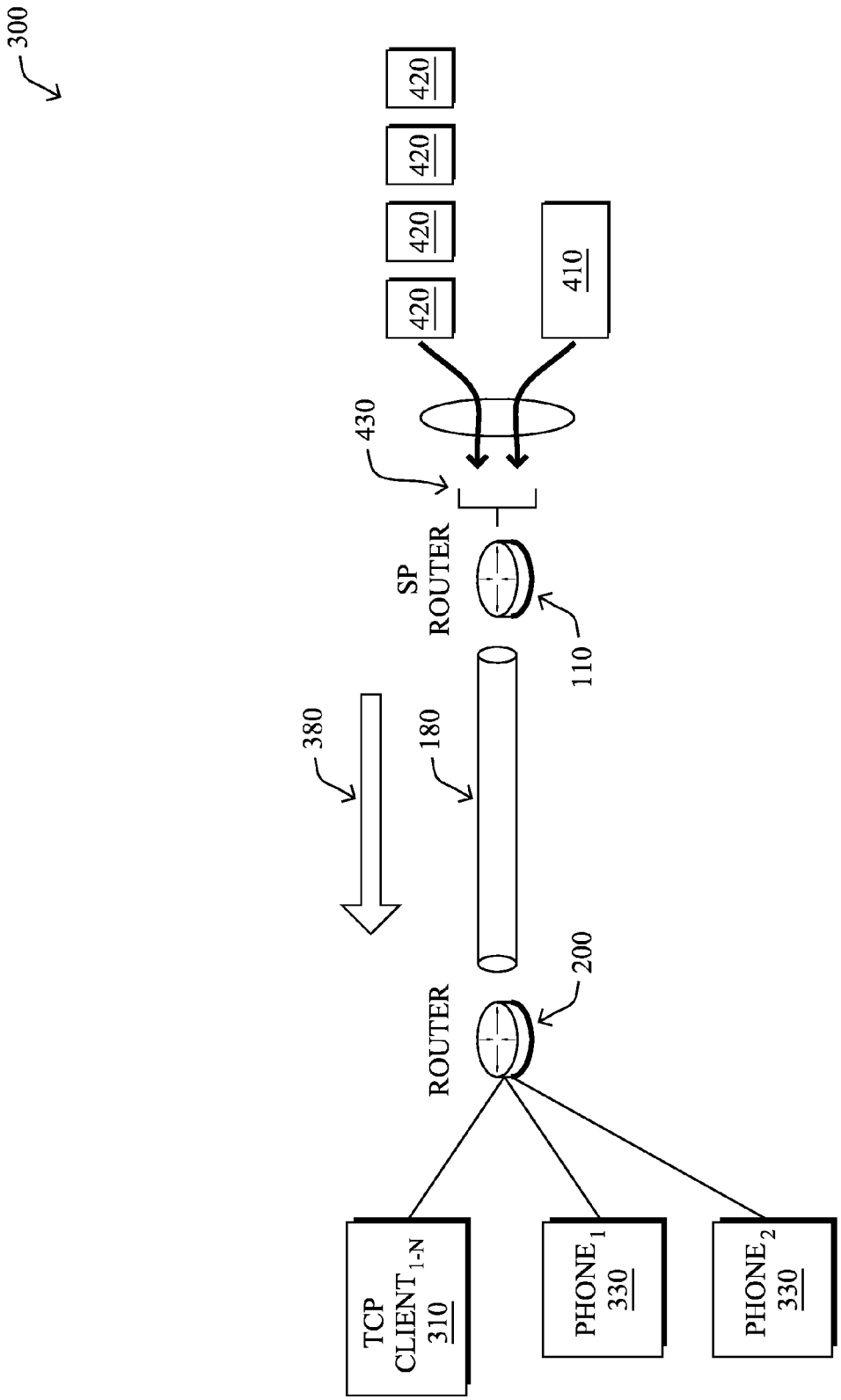
FIG. 4A illustrates an example view of time probes sent over the communication network.

FIG. 4A illustrates an example simplified view of time probes sent over communication network 300. A plurality of time-stamped probes 420 are received by SP router 110. The time-stamped probes 420 are sent from a source that is expected to have a low packet delay variation (PDV) to the last service provider router. For example, a media relay at a Traversal Using Relay around Network address translator (TURN) server used for real-time over-the-top (OTT) traffic to the customer; or a conferencing data center originating some real-time OTT traffic to the customer. The probes 420 may be standalone or attached to existing traffic as for example real-time protocol (RTP) timestamps or extensions. Alternatively, the time-stamped probes may be any other series of messages sent with time stamps.

The SP router 110 combines the plurality of time-stamped probes 420 and other TCP-based traffic 410 into a single queue. The probes 420 are then sent intermixed with TCP traffic 410 over bottleneck link 180 to client router 200. The probes 420 are sent with a sender time stamp, S(i), of the local clock of the sending equipment, for example a 64-bit, millisecond wall clock. Router 200 receives each probe and stores a received time R(i) with each respective send time S(i) for all recent i. The recent i may be saved for a set period of time to allow the router to store data related to when queue 430 was not congested, but also limits the total amount of stored timestamps. Router 200 determines a difference between send time S(i) and receive time R(i) for each time stamp. The sending and receiving wall clocks do not need to be synchronized to determine if a significant queuing delay exists, if a queuing delay is increasing, or if a queuing delay is decreasing.

Figure 4B:
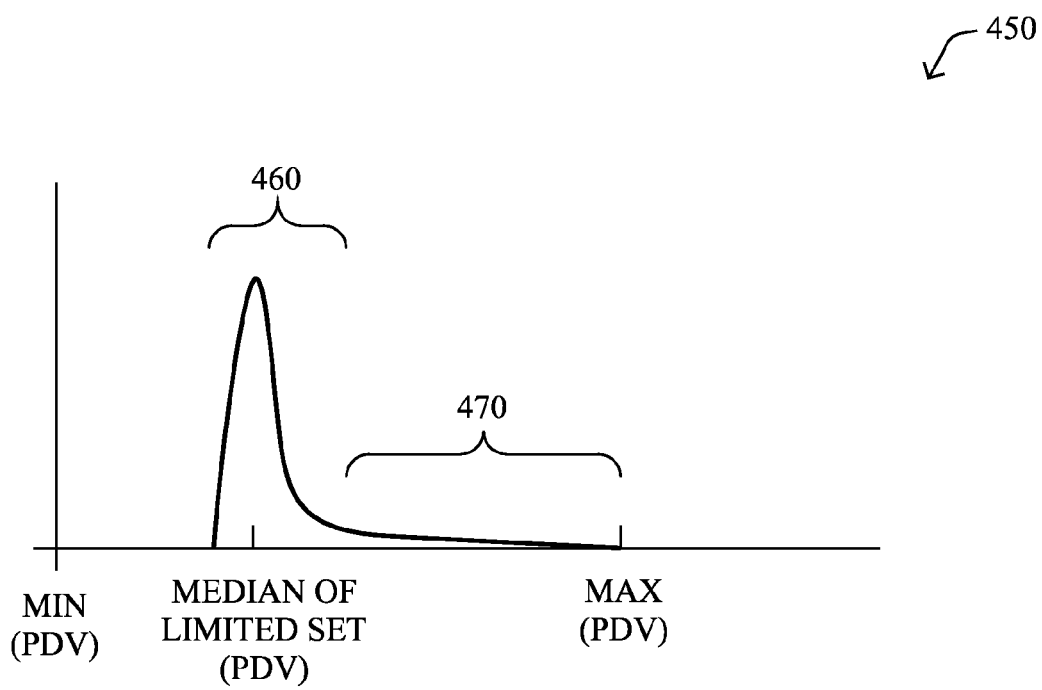
FIG. 4B illustrates a graphical view of the median packet delay variation.

FIG. 4B illustrates a graphical view 450 of the median packet delay variation (PDV) based on the differences in send and receive time for a plurality of probes 420 over a time period. For example, the time period may be 500 ms. The graph includes the minimum PDV (min(PDV)) and the maximum PDV (max(PDV)). The first region 460 includes most of the PDV values, which are more representative of the nominal transmit time difference. The second region 470 includes the PDV values that are the outlier samples and such samples could be the result of non-optimal transmission through any element in the path to this point, including devices such as firewalls, security appliances, gateways, processing errors, etc. The median PDV is taken of the first region 460. This value may be stored also with other send time and receive times.

Figure 4C:
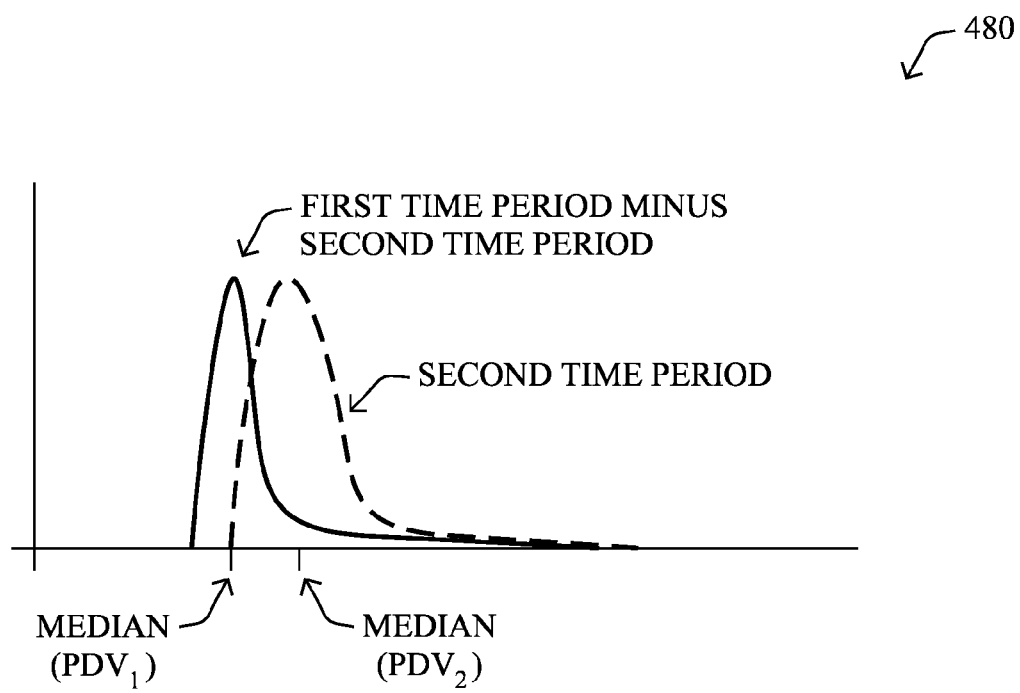
FIG. 4C illustrates a graphical view of the median packet delay variation over two time periods.

FIG. 4C illustrates a graphical view 480 of the median packet delay variation over two time periods. For example the first time period may be 500 ms except for the last 150 ms, and the second time period may be the last 150 ms. The median PDV is calculated for both the first and second time period. The median PDV may be calculated only from the wanted PDV dataset of each time period (time period 460 in FIG. 4B). In graph 480, the first median PDV for the first time period is less than the second median PDV for the second PDV, which indicates that a queue is growing at the SP router 110. If, for example, the first median PDV for the first time period is greater than the second median PDV for the second PDV, then the graph would indicate that the queue is shrinking at the SP 110. If, for example, the first median PDV for the first time period is about equal to the second median PDV for the second PDV, then the queuing delay determination process 248 would compare first and/or second median PDV to stored results to determine if a queue exists at the SP 110. Although, the median of a sample (histogram) distribution is used to determine transmission time differential delay, it should be apparent to those skilled in the art any other method that similarly discounts "outliers" to attain a similar measure could be used.

Figure 5:
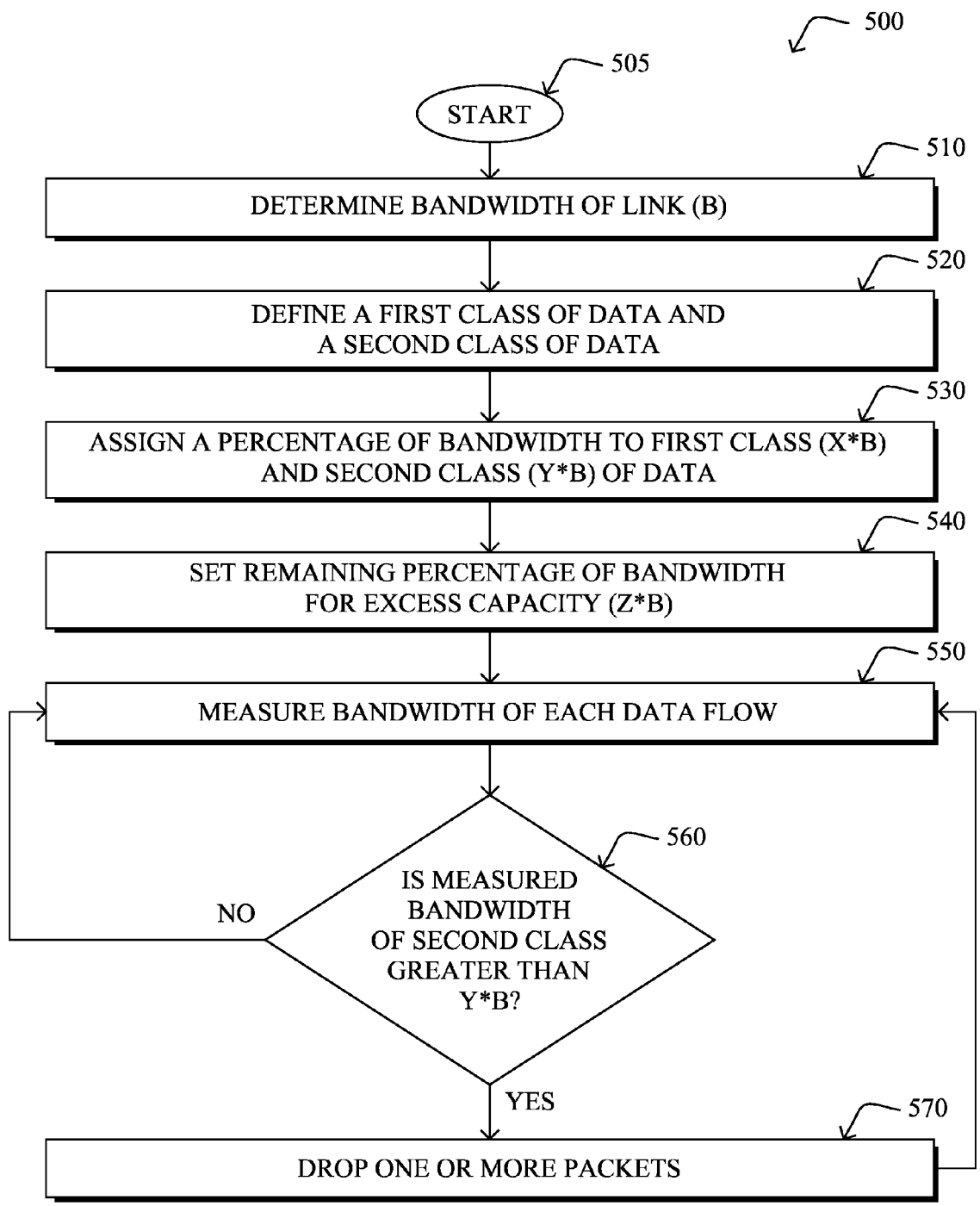
FIG. 5 illustrates an example simplified procedure for managing traffic of classes of data.

FIG. 5 illustrates an example simplified procedure for managing traffic of classes of data in a communication network in accordance with one or more embodiments described herein. The procedure 500 may start at step 505, and continues to step 510, where the bandwidth, B, of link 180 is determined. The bandwidth may be generated based on a speed test over a few seconds when link 180 is under minimum use. Next at step 520, a first class of data 350 and a second class of data 360 are defined. The first class of data 350 may be audio and/or video, or any other time sensitive traffic. More classes of data may be defined if necessary. Then at step 530, the first class of data is assigned a certain percentage of bandwidth, X (i.e. $X/100*B_{FL}$), and the second class is assigned a certain percentage of bandwidth, Y (i.e. $Y/100*BFL$), subject to the constraint that X+Y must be less than 100. At step 540, the initial nominal excess capacity bandwidth target, Z (i.e., Z=100−X−Y) is set.

At step 550, the bandwidth of each data flow is measured. The measurements may be taken within router 200 or anywhere on the path that sees each packet within the customer premises. For example, a bump-in-wire device such as device 900 may monitor. In other words, each data flow is part of either the first class of data or the second class of data. Each data flow within a class of data is added together as they cross the link 180. At step 560, a determination is made if the measured bandwidth of all classes of data crossing link 180 is greater than $(X+Y)*B_{FL}/100$. If no, then the system monitors the bandwidth across link 180. If yes, then at step 570, the system takes actions to reduce the flow of data down link 180. The preferred action is to drop packets (or apply an explicit congestion notification (ECN) to packets) of the most bandwidth intensive flows outside of the first class of data; this will, in turn, cause the corresponding data source to eventually slow down.

Figure 6:
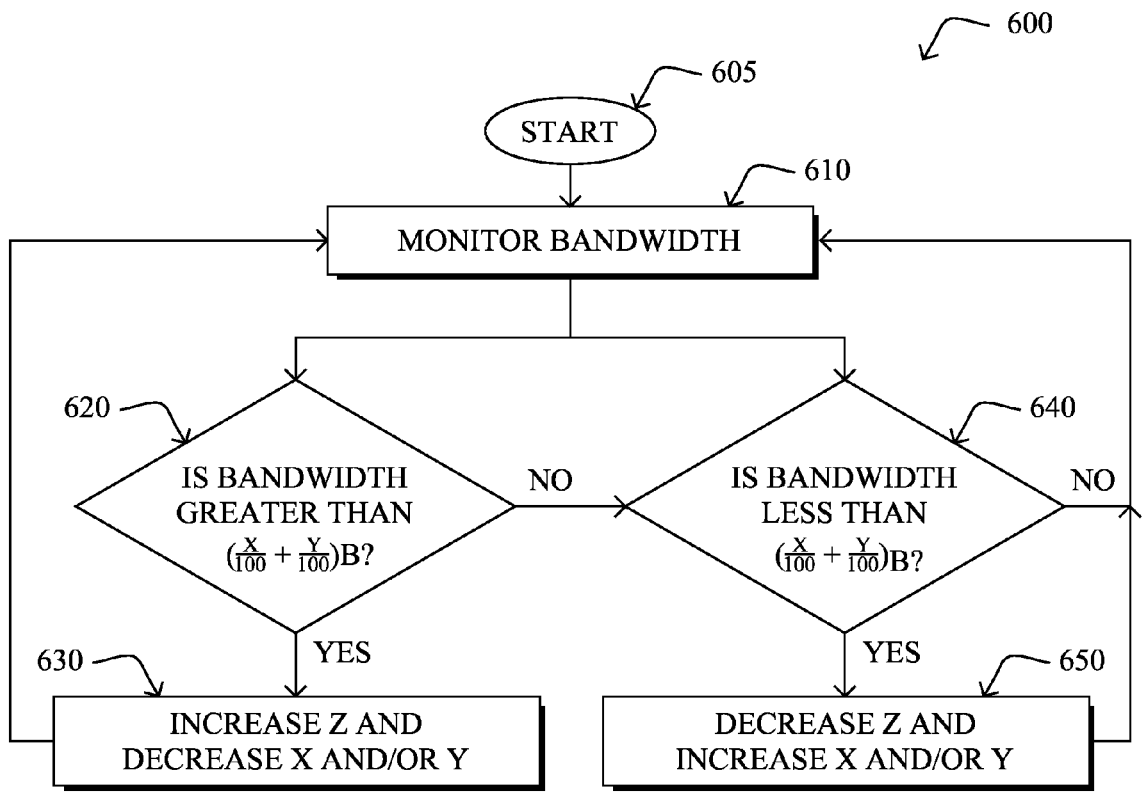
FIG. 6 illustrates an example simplified procedure for adjusting underutilization factor.

FIG. 6 illustrates an example simplified procedure 600 for adjusting underutilization factor in a communication network in accordance with one or more embodiments described herein. The procedure 600 may start at step 605, and continues to step 610, where the system monitors the bandwidth of link 180. Monitoring the bandwidth includes monitoring each flow of traffic and tracking the total amount of flow of traffic within each class of data (first and/or second class of data). Next at step 620, the system determines if the monitored bandwidth is greater than the sum of percentage assigned to the first class of data multiplied by the bandwidth plus the percentage assigned to the second class of data times the bandwidth (i.e., $(X/100+Y/100)*B_{FL}$). If yes, then at step 630, the percentage (Z) assigned to excess capacity is increased and the percentage assigned to the first class (X) and/or the percentage assigned to the second class (Y) are decreased. Generally, only Y is decreased, as the first class has typically been engineered to a value sufficient for the customer's quality of experience for this class of traffic. The change may be different steps, for example a step of 5%, 1%, or 0.5%. Also, the step size may vary at different times of the day. Then, the system goes back to monitoring the bandwidth.

If the monitored bandwidth is not greater than $X/100+Y/100)*B_{FL}$, then at step 640, the system determines if the monitored bandwidth is less than $X/100+Y/100)*B_{FL}$. If yes, then at step 650, the percentage assigned to excess capacity (Z) may be decreased, and the percentage assigned to the first class (X) and/or the percentage assigned to the second class (Y) could be increased. Generally, only Y is increased, as the first class has typically been engineered to a value sufficient for the customer's quality of experience for this class of traffic. Then, the system continues to monitor the bandwidth of link 180. If the monitored bandwidth is not less than $X/100+Y/100)*B_{FL}$, then the system goes to step 610 and continues to monitor the bandwidth of link 180.

Figure 7A:
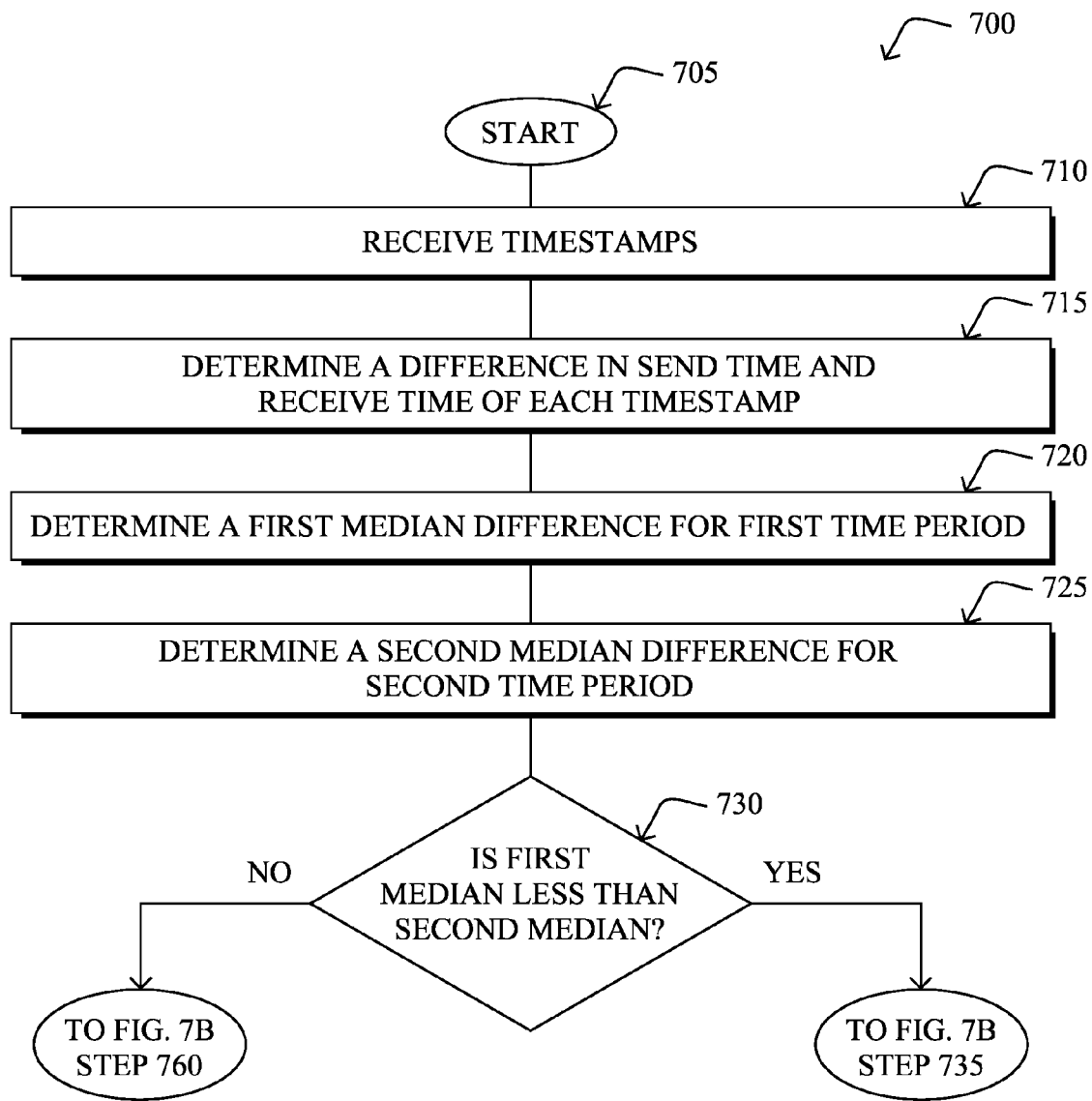
FIGS. 7A-B illustrate an example simplified procedure for adjusting underutilization factor with respect to median packet delay variation.
Figure 7B:
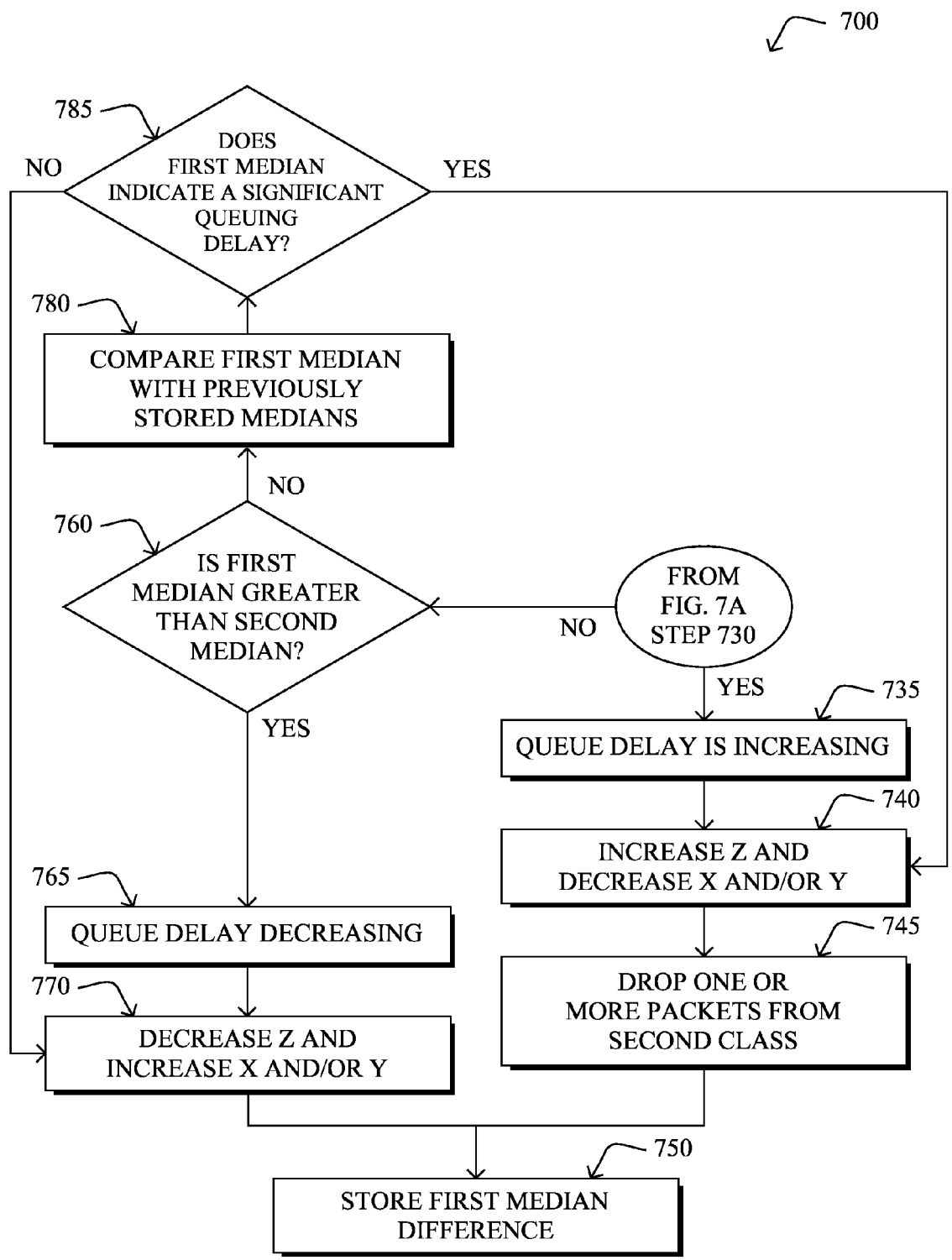

FIGS. 7A-7B illustrate an example simplified procedure for adjusting excess capacity percentage-with respect to median packet delay variation in a communication network in accordance with one or more embodiments described herein. The procedure 700 may start at step 705, and continues to step 710, where the router 200 receives a plurality of time stamps. The timestamps may be standalone time stamp probes and/or embedded within data packets. Each time stamp includes a send time (S(i)). Next, at step 715, for each time stamp received, the system determines a difference in send time S(i) and receive time R(i). Then at step 720, the system determines a first median difference for the median value of the difference in send and receive times for each time stamp in a first time period. The first median may exclude any outlier timestamps. Next at step 725, the system determines a second median difference from the differences in send and receive times of time stamps within a second time period. The second time period may be a portion of the first time period or may be a period of time right after the second time period. For example the second time period may be the last 150 ms of the first time period and the first time period is 500 ms. In addition or alternatively, the first time period may be equal to the time before the second time period.

At step 730, the system next determines if the first median difference is less than or equal to the second median difference. If yes, then that determination indicates that a queue increasing because the queue delay time is increasing at step 735. In response at step 740, the percentage assigned to excess capacity (Z) is increased and the percentage applied to the first class (X) and/or the percentage applied to the second class (Y) are decreased. Next at step 745, the system takes actions to reduce the flow of data down link 180. The preferred action is to drop packets (or apply an ECN to packets) of the most bandwidth intensive flows outside of the first class of data; this will, in turn, cause the corresponding data source to eventually slow down. Then, at step 750 the first median difference may be stored with recent received send and received times.

If the first median difference is not less than or equal to the second median difference, then at step 760 the system determines if the first median is greater than the second median. If yes, then at step 765, the router can infer that the queue delay is decreasing because the delay time is decreasing. Then at step 770, the percentage assigned to excess capacity (Z) is decreased and the percentage applied to the first class (X) and/or the percentage applied to the second class (Y) are increased. Then, at step 750 the first median difference may be stored with recent received send and received times.

If the first median is not greater than the second median, then at step 780 then the first median is compared with previously stored medians and/or stored send and receive times. Then at step 785, the system determines if the first median indicates a significant queuing delay exists. If the first median is less than or equal to most saved send and receive differences and/or stored medians, then that indicates there is not a significant queuing delay and then the system may apply step 770 and decrease the percentage assigned for excess capacity and increase the percentage assigned for the first class of data and/or the percentage assigned to the second class of data. If the first median is greater than most of the previously stored medians and/or most saved send and receive time differences, then that indicates there is a significant queuing delay. To remove the queue delay, the system may apply step 740 and increase the percentage assigned for excess capacity and decrease the percentage assigned for the first class of data and/or the percentage assigned to the second class of data.

Figure 8:
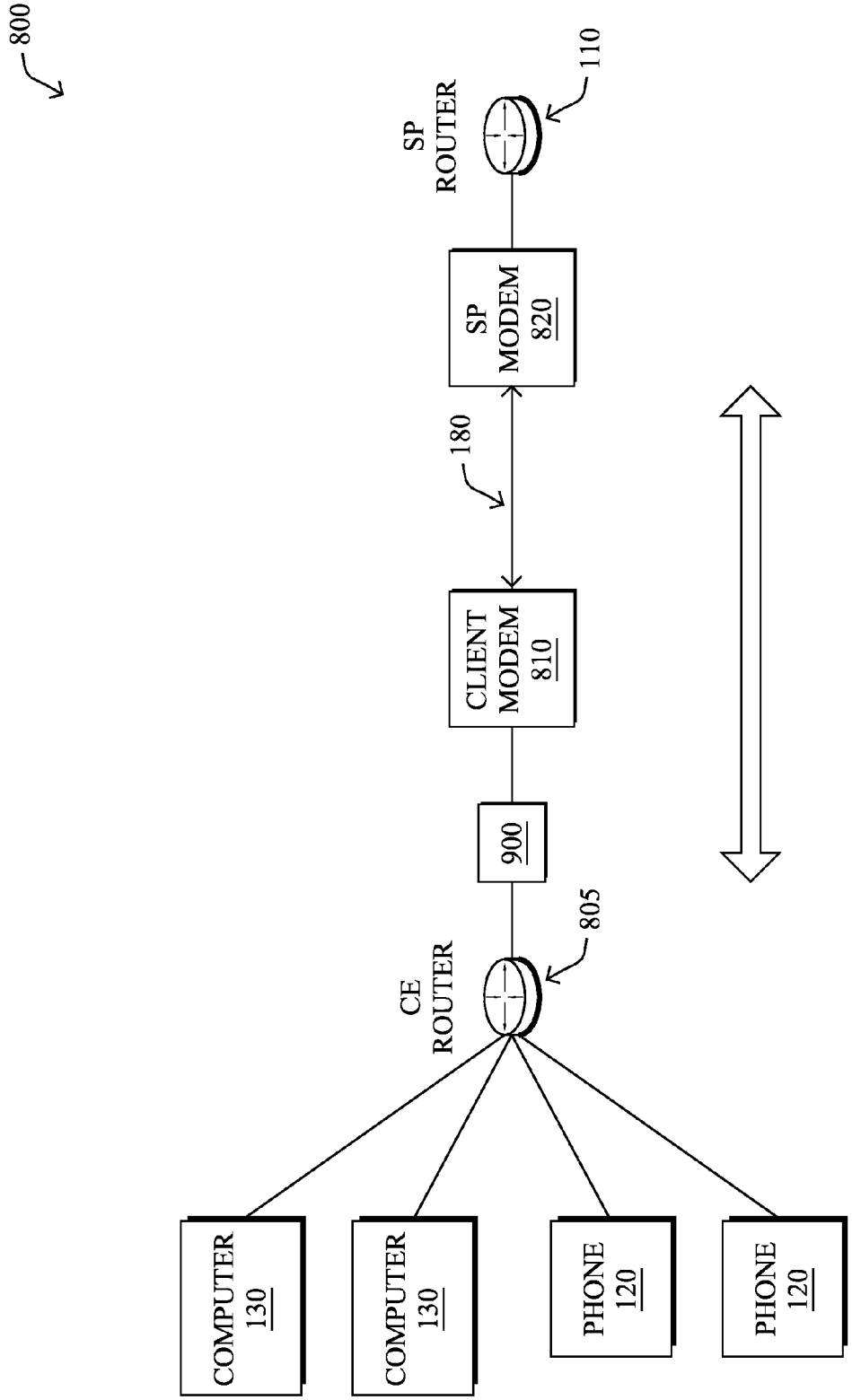
FIG. 8 illustrates another example communication network.

While the FIGS. 1-7 generally minimize queuing delay for downstream traffic toward the customer, FIGS. 8-11 generally minimize queuing delay for upstream traffic going away from the customer. However, device 900 may be used to minimize queuing delay for both upstream and downstream traffic. Device 900 may be part of a router, such as router 200 located on the customer side of client modem or a standalone bump-in-wire device. FIG. 8 is a schematic diagram of another example computer network 800 illustratively comprising a nodes/device 900 interconnected in parallel by various methods of communication to client edge router 805 and a client modem 810. The client edge router is connected to one or more electronic devices (telephone 120, laptop 130, etc.). Additionally, client modem connects to service provider (SP) modem 820 via link 880. The SP modem connects to the SP router which generally includes a single buffer. From the SP router any other device is reachable over the internet. Those skilled in the art will understand that any number of nodes, devices, links, etc. may be used in the computer network, and that the view shown herein is for simplicity.

Figure 9:
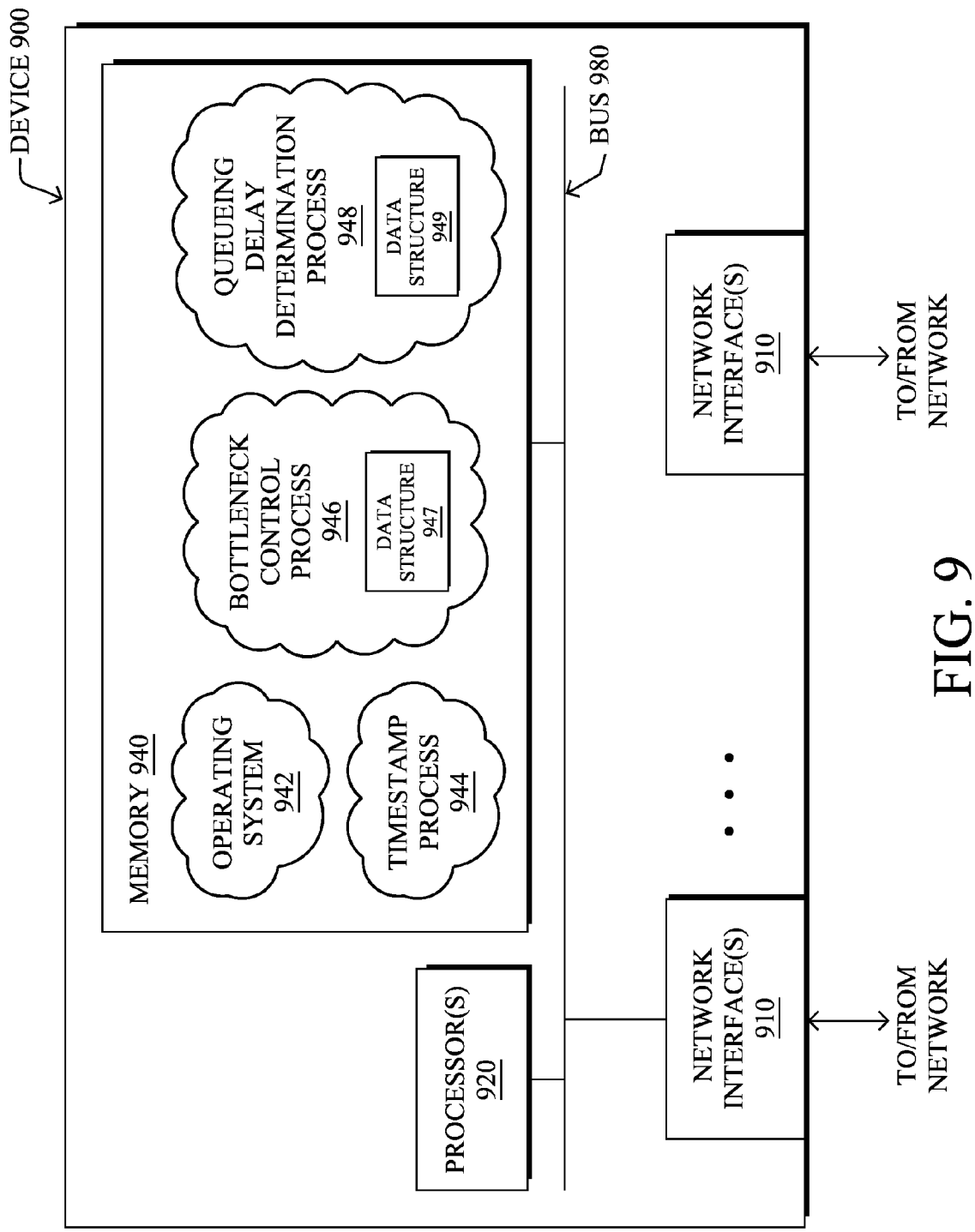
FIG. 9 illustrates an example stand-alone network device/node.

FIG. 9 is a schematic block diagram of an example node/device 900 that may be used with one or more embodiments described herein, e.g., as any of the nodes shown in FIG. 8 above. For example the device 900 may be part of the client router 805 or a standalone device. The device may comprise one or more network interfaces 910 (e.g., wired, wireless, PLC, etc.), at least one processor 920, and a memory 940 interconnected by a system bus 980, as well as a power supply (not shown) (e.g., battery, plug-in, etc.).

The network interface(s) 910 contain the mechanical, electrical, and signaling circuitry for communicating data over link 880 coupled to the network 800. The network interfaces may be configured to transmit and/or receive data using a variety of different communication protocols. Note, further, that the nodes may have two different types of network connections 910, e.g., wireless and wired/physical connections, and that the view herein is merely for illustration.

The memory 940 comprises a plurality of storage locations that are addressable by the processor 920 and the network interfaces 910 for storing software programs and data structures associated with the embodiments described herein. The processor 920 may comprise hardware elements or hardware logic adapted to execute the software programs and manipulate data structures. An operating system 942, portions of which are typically resident in memory 940 and executed by the processor, functionally organizes the device by, inter alia, invoking operations in support of software processes and/or services executing on the device. These software processes and/or services may comprise bottleneck control process 946, queuing delay determination process 948, and/or a timestamp process 944. Note that while bottleneck control process 946, queuing delay determination process 948, and/or timestamp process 944 is shown in centralized memory 940, alternative embodiments provide for the process to be specifically operated within the network interfaces 910.

Bottleneck control process 946 contains computer executable instructions executed by the processor 920 to perform functions relating to the techniques herein as described in greater detail below, such as to define at least two different types of traffic and to manage a bandwidth nominal excess capacity. The classes may be defined for both upstream and/or downstream traffic. The classes may be the same or different for upstream and downstream traffic. Further, bottleneck control process 946 includes data structure 947 that may be used to store the percentage of bandwidth assigned to each of the different types of traffic and the nominal excess capacity. Additionally, the bottleneck control process 946 may determine if the nominal excess capacity target should be modified larger or smaller for the upstream direction and/or downstream direction.

Timestamp process 944 contains computer executable instructions executed by the processor 920 to perform functions relating to the techniques herein as described in greater detail below, to send a plurality of timestamps with a send time to a destination that is expected to have a low packet delay variation (PDV) to the last service provider router. The timestamp process 944 and/or the queuing delay determination process 948 receive the timestamps from the destination. Each timestamp includes a send time from device 900 and a receive time from the destination. Alternatively, the destination may send a message for each time stamp with a difference in send and receive time.

Queuing delay determination process 948 contains computer executable instructions executed by the processor 920 to perform functions relating to the techniques herein as described in greater detail below, such as to determine if queue exists at the client modem for upstream traffic and/or at service provider router for downstream traffic. For downstream traffic, the queuing delay determination process and/or timestamp process 944 receives a plurality of timestamps, and/or time probes from another device and to determine if a queue exists. The queuing delay determination process 948 receives the time stamps and determines the difference in send time and receives time for each time stamp. Further, the queuing delay determination process 948 determines a first median difference between send and receive times for a first time period and a second median difference between send and receive times for a second time period. The second time period may be a part of the first time period. For example, the second time period may be the last 150 ms of the first time period. The queuing delay determination process 948 may then determine if there is a significant queuing delay, if queuing delay is increasing, and/or if queuing delay is decreasing. The queuing delay determination process 948 may include data structure 949 for storing the first median difference and/or the second median difference.

For upstream traffic, the queuing delay determination process and/or timestamp process 944 receives a plurality of timestamps from a destination, and/or difference in send and receive times for a plurality of timestamps and determines if a queue exists. The queuing delay determination process 948 receives the time stamps and determines the difference in send time and receives time for each time stamp. Further, the queuing delay determination process 948 determines a first median difference between send and receive times for a first time period and a second median difference between send and receive times for a second time period. The second time period may be a part of the first time period. For example, the second time period may be the last 150 ms of the first time period. The queuing delay determination process 948 may then determine if there is a significant queuing delay, if the queuing delay is increasing, and/or if the queuing delay is decreasing. The queuing delay determination process 948 may include data structure 949 for storing the first median difference and/or the second median difference.

Figure 10:
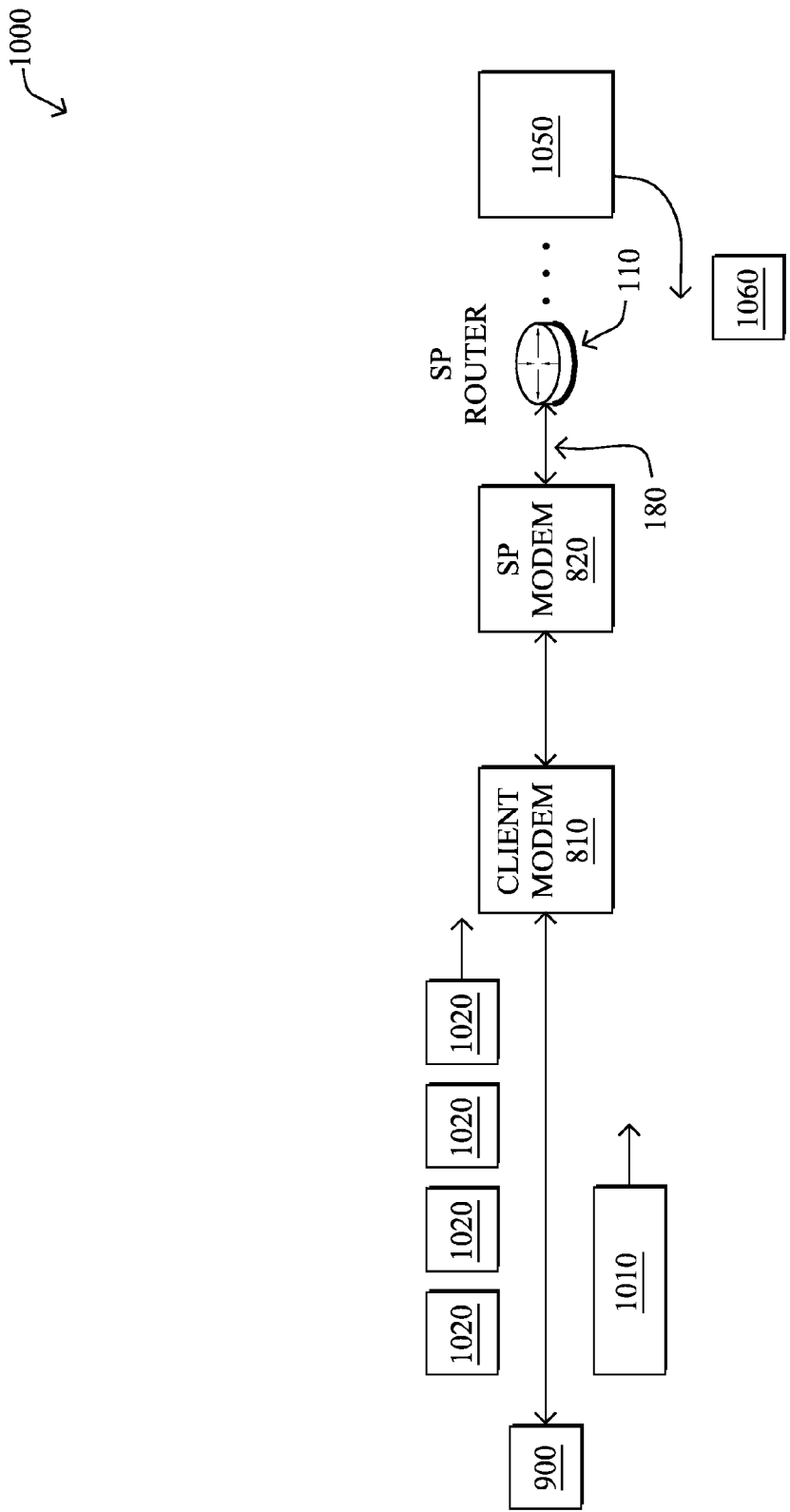
FIG. 10 illustrates an example view of time probes sent over the communication network.

FIG. 10 illustrates an example simplified view of time probes sent over communication network 1000. A plurality of timestamped probes 1020 are sent by device 900. The timestamped probes 1020 are sent to a destination that is expected to have a low packet delay variation (PDV) to the last service provider router. For example, a media relay at a TURN server used for real-time OTT traffic to the customer; points of presence (POPs) for cloud based services; or a web conferencing data center originating some real-time OTT traffic to the customer. The probes 1020 may be standalone or attached to existing traffic as for example RTP timestamps or extensions. Alternatively, the time-stamped probes may be any other series of messages sent with time stamps.

The client modem 810 combines the plurality of timestamped probes 1020 and other TCP-based traffic 1010 into a single queue. The probes 1120 are then sent intermixed with TCP traffic 1010 over bottleneck link 180 to SP modem 820. The probes 1020 are sent with a sender time stamp, S(i), of the local clock of the sending equipment within device 900, for example a 64-bit, millisecond wall clock. Another router 1050 receives each probe and sends the time probes 1020 back to device 900. The time probes 1020 then include both a send time from device 900 and a receive time from router 1050. Alternatively, router 1050 may send a packet 1060 to device 900 with a difference in send and receive time. Device 900 stores a received time R(i) with each respective send time S(i) for all recent i. The recent i may be saved a set period of time to allow device 900 to store data related to when queue within client modem 810 was not congested, but also limits the total amount of stored timestamps. Device 900 determines or receives a difference between send time S(i) and receive time R(i) for each time stamp. The sending and receiving wall clocks do not need to be synchronized to determine if a queue exists, if a queue is building, or if a queue is shrinking. Additionally, device 900 may also perform all functions above for receiving timestamp probes 420 from SP router 110.

Figure 11A:
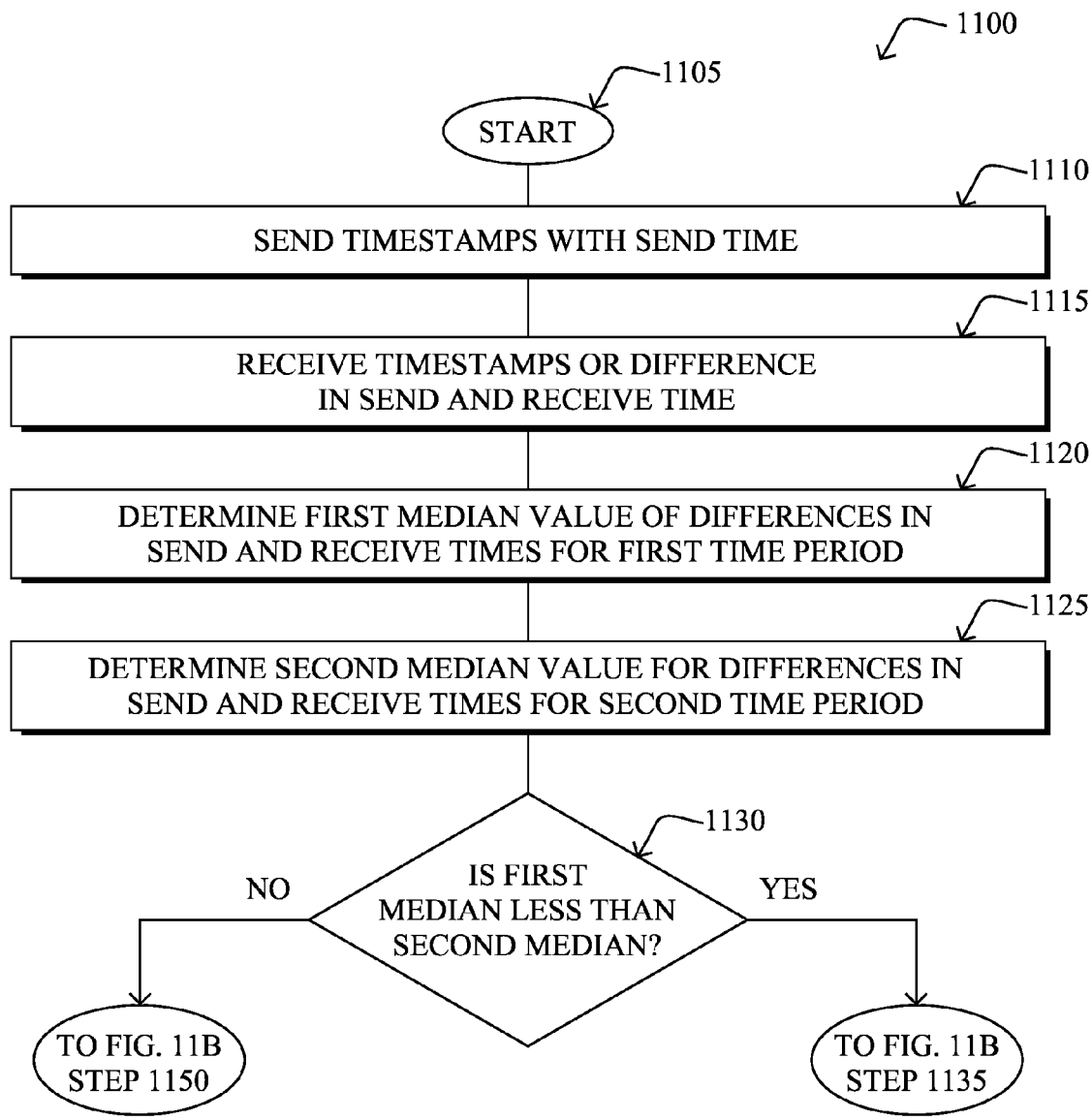
FIGS. 11A-11B illustrate an example simplified procedure for adjusting underutilization factor with respect to median packet delay variation.
Figure 11B:
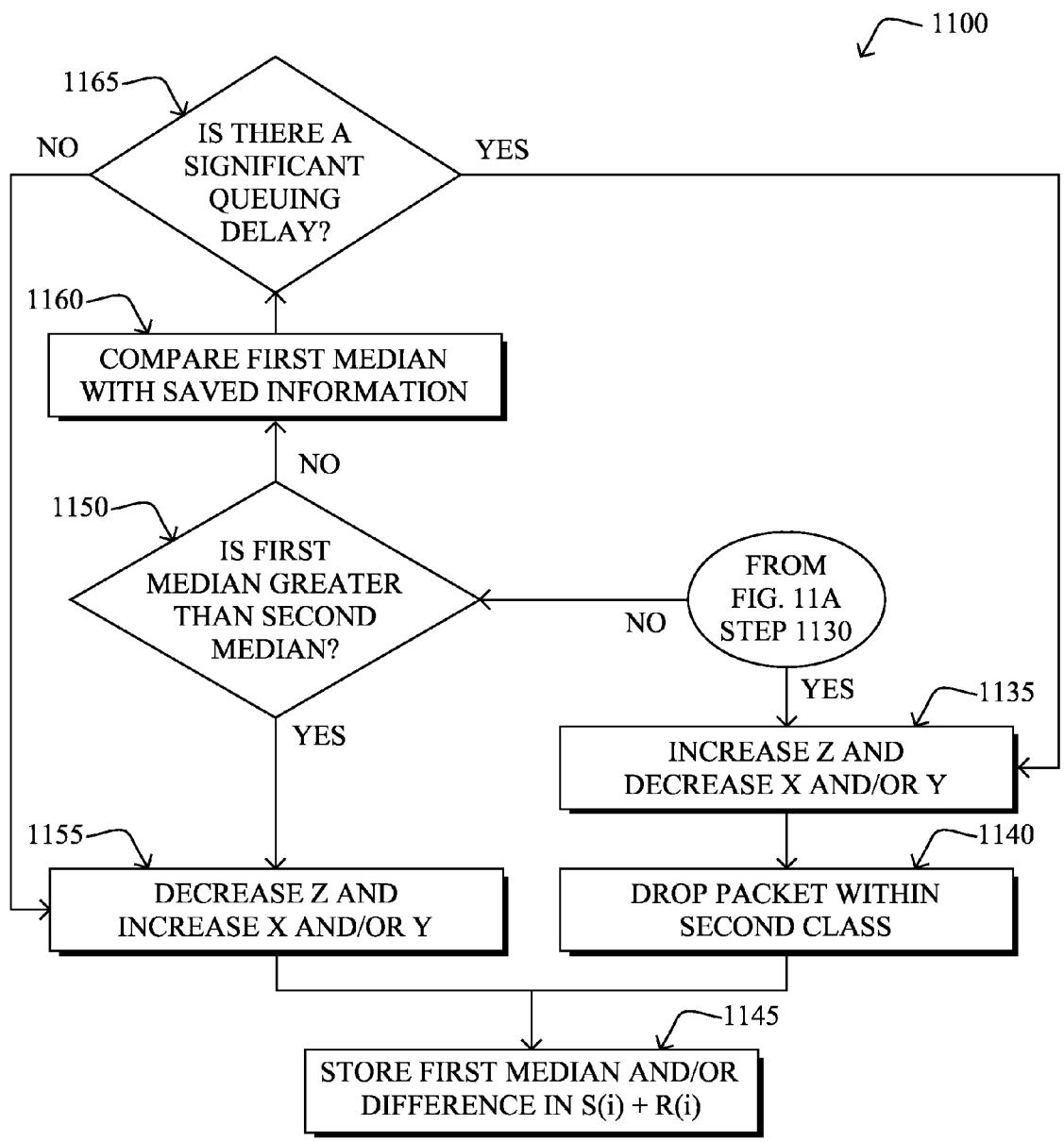

FIGS. 11A-11B illustrate an example simplified procedure for adjusting underutilization factor in the upstream direction with respect to median packet delay variation in a communication network in accordance with one or more embodiments described herein. The procedure 1100 may start at step 1105, and continues to step 1110, where the device 900 sends a plurality of time stamps to another device 1050 with low packet delay variation, for example a TURN server. The timestamps may be standalone time stamp probes and/or embedded within data packets. Each timestamp includes a send time (S(i)). At step 1115, device 900 receives the timestamps and/or a difference in send and receive times.

If device 900 does not receive a difference in send and receive times then, for each time stamp received, device 900 determines a difference in send time S(i) and receive time R(i). Then at step 1120, the system determines a first median difference for the median value of the difference in send and receive times for each time stamp in a first time period. The first median may exclude any outlier timestamps. Next at step 1125, the system determines a second median difference from the differences in send and receive times of time stamps within a second time period. The second time period may be a portion of the first time period or may be a period of time right after the second time period. For example the second time period may be the last 150 ms of the first time period and the first time period is 500 ms. In addition or alternatively, the first time period may be equal to the time before the second time period, for example first time period is 350 ms and second period is 150 ms of an overall time period of 500 ms.

Then at step 1130, the system determines if the first median difference is less than the second median difference. If yes, then that determination indicates that a queue increasing and device 900 responds at step 1135 by increasing the percentage assigned to excess capacity (Z) and decreasing the percentage applied to the first class (X) and/or the percentage applied to the second class (Y). Generally, only Y is decreased, as the first class has typically been engineered to a value sufficient for the customer's quality of experience for this class of traffic. Next at step 1140, device 900 may notify the client router 810 to slow down the second class of traffic. Device 900 takes actions to reduce the flow of data flowing upward on link 180. The preferred action is to drop packets (or apply an ECN to packets) of the most bandwidth intensive flows outside of the first class of data; this will, in turn, cause the corresponding data source to eventually slow down. Alternatively, device 900 may request the client modem 810 to use other means to slow down second class of traffic such as packet loss, congestion window modification, etc. Then, at step 1145 the first median difference may be stored with recent received send and received times. Alternatively each difference in send and receive time may be saved in memory.

If the first median difference is not less than or equal to the second median difference, then at step 1150 the system determines if the first median is greater than the second median. If yes, then at step 1155, device 900 may infer that the queue delay is decreasing and decrease percentage assigned to excess capacity (Z) and increase the percentage applied to the first class (X) and/or the percentage applied to the second class (Y). Generally, only Y is increased, as the first class has typically been engineered to a value sufficient for the customer's quality of experience for this class of traffic. Then, at step 1145 the first median difference may be stored with recent received send and received times.

If the first median is not greater than the second median, then at step 1160 then the first median is compared with previously stored medians and/or stored send and receive times. Then at step 1165, device 900 determines if there is a significant queuing delay. There is a significant queuing delay when the first median is greater than most stored difference in send and receive times or most stored median values. If there is a significant queuing delay, then device 900 may apply step 1135 and/or 1140 to decrease the queue. If there is not a significant queuing delay, then device 900 may apply step 1155 to decrease the percentage for excess capacity.

It should be noted that while certain steps within procedures 500-700 and 1100 may be optional as described above, the steps shown in FIGS. 5-7, and 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-700 and 1100 are described separately, certain steps from each procedure may be incorporated into each other procedure, and the procedures are not meant to be mutually exclusive. For example, FIG. 5 and FIG. 6 are described with regard to traffic going toward CE router, however one or both figures may also be used for traffic traveling away from CE router.

The techniques described herein, therefore, provide for dynamic control of the queue at the service provider router from the client edge router without service provider intervention. In particular, the techniques herein the percentages assigned to each class of traffic are self-discovering and require no provisioning and dynamically adjust based on usage. The techniques may also limit the non-time sensitive traffic flow over the link to solve the "bufferbloat problem", i.e. when there is high latency for downstream traffic and upstream traffic.

While there have been shown and described illustrative embodiments that provide for dynamic control of the queue at the service provider router from the client edge router without service provider intervention, it is to be understood that various other adaptations and modifications may be made within the spirit and scope of the embodiments herein. For example, the embodiments have been shown and described herein with relation to small corporate networks. However, the embodiments in their broader sense are not as limited, and may, in fact, be used with other types of networks and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining bandwidth of a link that connects a local router to a remote router;
   assigning a first percentage of the bandwidth to a first class of data;
   assigning a second percentage of the bandwidth to a second class of data;
   assigning a remaining percentage of the bandwidth for nominal excess capacity; and
   controlling flow of the first class of data and the second class of data to below respective percentages of the bandwidth.

2. The method as in claim 1, further comprising:
   measuring bandwidth of each traffic flow;
   aggregating, for each class of data, the bandwidth of respective data traffic within that class of data;
   determining if the aggregate for the second class of data is greater than the second percentage assigned to second class times the bandwidth; and
   in response to determining that the aggregate for the second class of data is greater than the second percentage assigned to the second class times the bandwidth, notifying the remote router to decrease sending traffic flows within the second class.

3. The method as in claim 2, further comprising:
   notifying the remote router to apply at least one of dropping one or more packets from second class of traffic or adjust packet size of packets within second class of traffic.

4. The method as in claim 2, further comprising:
   notifying the remote router to slow down one high bandwidth traffic flow within the second class of traffic.

5. The method as in claim 1, further comprising:
   receiving a plurality of timestamp probes over a first time period;
   determining a first median difference based on a difference in send and receive times for each timestamp probe received in the first time period;

determining a second median difference based on a difference in send and receive for each time stamp probe received in a second time period;
determining if the first median difference is less than the second median difference; and
in response to determining the first median difference is less than the second median, increasing the percentage assigned for excess capacity and decreasing the percentage assigned to at least one of the first class or second class of data.

6. The method as in claim 5, wherein the second time period is one of either an end portion of time of the first time period or a subsequent period directly after the first time period.

7. The method as in claim 1, further comprising:
receiving a plurality of timestamp probes over a first time period;
determining a first median difference based on a difference in send and receive times for each timestamp probe received in the first time period;
determining a second median difference based on a difference in send and receive for each time stamp probe received in a second time period;
determining if the first median difference is less than the second median difference; and
in response to determining the first median difference is not less than the second median, decreasing the percentage assigned for excess capacity and increasing the percentage assigned to at least one of the first class or second class of data.

8. The method as in claim 7, wherein the second time period is one of either an end portion of time of the first time period or a subsequent period directly after the first time period.

9. The method as in claim 1, wherein the first class of data is selected from a group consisting of: time sensitive data; audio data; and video data.

10. The method as in claim 1, wherein the second class of data is selected from a group consisting of: non-time sensitive data; and transmission control protocol (TCP) data.

11. The method as in claim 1, further comprising:
measuring bandwidth for a predetermined number of round trips; and
determining if excess capacity is correct based on the measured bandwidth.

12. The method as in claim 1, further comprising:
sending a plurality of timestamps each with a send time;
receiving the plurality of timestamps each with the send time and a receive time embedded from another device;
determining a difference in send time and receive time for each time stamp; and
comparing the difference in send time and receive time to determine if a queue exists.

13. The method as in claim 12, further comprising:
determining if the queue is increasing by comparing earlier difference in send and receive times in a time period with later differences in send and receive times; and
in response to the later differences in send and receive times being higher than the earlier differences in send and receive times, increasing the percentage set for excess capacity.

14. The method as in claim 13, further comprising:
in response to the later differences in send and receive times being higher than the earlier differences in send and receive times, notifying a client modem to slow traffic within the second class of traffic.

15. The method as in claim 1, wherein the step of controlling further comprises:
aggregating measured bandwidth of a plurality of data streams separately within the first class and second class;
determining if the aggregated measured bandwidth is greater than the percentage assigned to both the first and second classes;
in response to determining aggregated bandwidth is greater than the percent assigned to both first and second classes, increasing the percentage assigned for excess capacity and decreasing the percentage assigned to at least one of the first class or the second class; and
in response to determining aggregated bandwidth is not greater than the percent assigned to both first and second classes, decreasing the percentage assigned for excess capacity and increasing the percentage assigned to at least one of the first class or the second class.

16. The method as in claim 1, wherein the measured bandwidth is one of either a downstream bandwidth or an upstream bandwidth.

17. An apparatus, comprising:
one or more network interfaces to communicate with a network;
a processor coupled to the network interfaces and adapted to execute one or more processes; and
a memory configured to store a process executable by the processor, the process when executed operable to:
determine bandwidth of a link that connects a client edge modem to a service provider router;
assign a first percentage of the bandwidth to a first class of data;
assign a second percentage of the bandwidth to a second class of data;
assign remaining percentage of the bandwidth for excess capacity; and
control flow of first class of data and second class of data to below respective percentages of the bandwidth.

18. The apparatus as in claim 17, wherein the apparatus is a standalone device.

19. The apparatus as in claim 18, wherein the apparatus is connected in parallel between a client router and the client edge modem.

20. The apparatus as in claim 17, wherein the apparatus is part of a client edge router.

21. The apparatus as in claim 17, wherein the apparatus minimizes a queue formed in the service provider router.

22. The apparatus as in claim 17, wherein the apparatus minimizes a queue formed in the client edge modem.

23. A tangible, non-transitory, computer-readable media having software encoded thereon, the software when executed by a processor operable to:
determine bandwidth of a link that connects a client edge modem to a service provider router;
assign a first percentage of the bandwidth to a first class of data;
assign a second percentage of the bandwidth to a second class of data;
assign remaining percentage of the bandwidth for excess capacity; and
control flow of first class of data and second class of data to below respective percentages of the bandwidth.

* * * * *